United States Patent [19]

Meyman

[11] Patent Number: 4,641,550
[45] Date of Patent: Feb. 10, 1987

[54] AUTOMATIC TRANSMISSION UTILIZING GYROSCOPIC SATELLITE GEARS

[76] Inventor: Usher Meyman, 230 Ocean Pkwy., Brooklyn, N.Y. 11218

[21] Appl. No.: 728,500

[22] Filed: Apr. 29, 1985

[51] Int. Cl.[4] ............................................. F16H 3/74
[52] U.S. Cl. ........................................ 74/751; 74/394
[58] Field of Search ................ 74/797, 799, 751, 5 R, 74/394, 417, 420

[56] References Cited

U.S. PATENT DOCUMENTS

| | | | |
|---|---|---|---|
| 1,805,612 | 5/1931 | Chapman | 74/751 |
| 2,052,507 | 8/1936 | Walton | 74/751 |
| 2,296,654 | 9/1942 | Stein et al. | 74/751 |
| 2,389,826 | 11/1945 | Stalker | 74/5 R |
| 2,453,684 | 11/1948 | Cloete | 74/751 |
| 2,639,631 | 5/1953 | Taylor | 74/5 R X |
| 2,960,889 | 11/1960 | Keyser | 74/751 |
| 3,153,353 | 10/1964 | Voigt | 74/751 |
| 3,267,770 | 8/1966 | Fry | 74/751 |
| 3,495,479 | 2/1970 | Rass | 74/751 |
| 3,851,545 | 12/1974 | Gumlich | 74/751 |

FOREIGN PATENT DOCUMENTS 335495 2/1936 Italy .................................... 74/799

Primary Examiner—Leslie Braun
Assistant Examiner—Dwight G. Diehl
Attorney, Agent, or Firm—Ilya Zborovsky

[57] ABSTRACT

An automatic transmission has a driving shaft and a driven shaft rotatable about an axis of the transmission, a first gear drive including central gears mounted on the shafts and satellite gears engaging with the central gears, a second gear drive including central gears and gyroscopic satellite gears engaging the central gears of the second gear drive and mounted on a carrier, elements connecting the gear drives with one another and transmitting gyroscopic moments from the second gear drive to the first gear drive, and a reactor engaging the central gears of the second gyroscopic gear drive.

4 Claims, 13 Drawing Figures

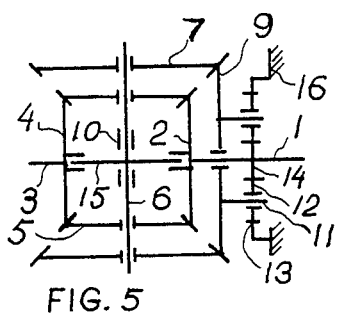
FIG. 5
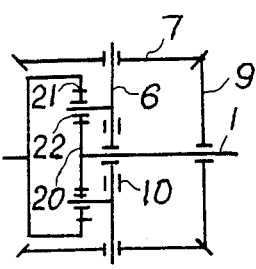
FIG. 6
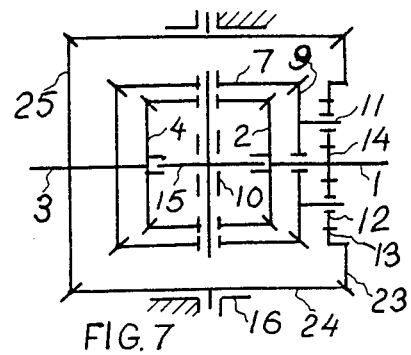
FIG. 7
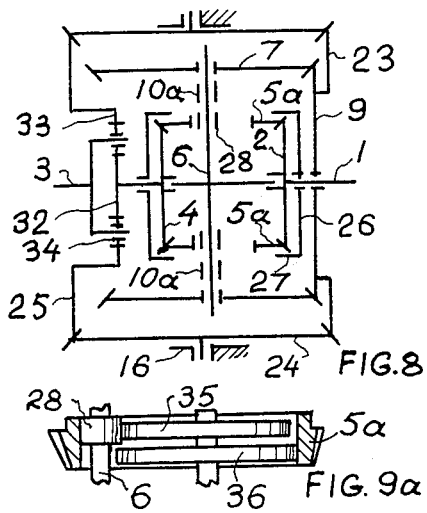
FIG. 8
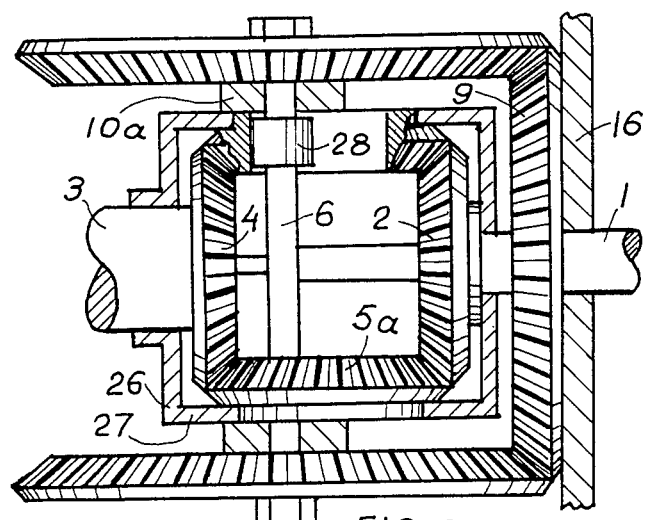
FIG. 9
FIG. 9a
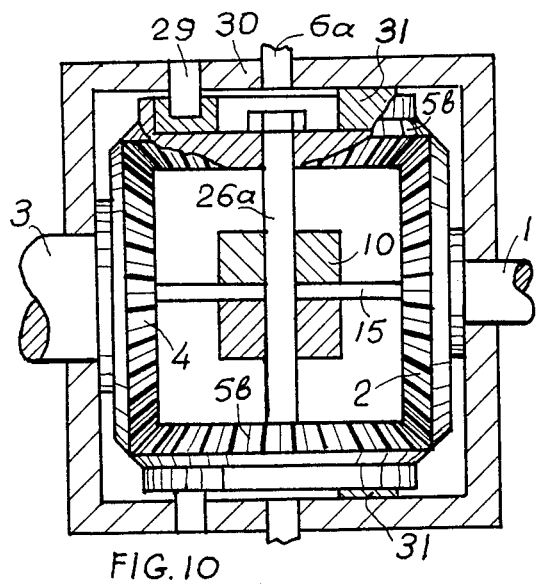
FIG. 10
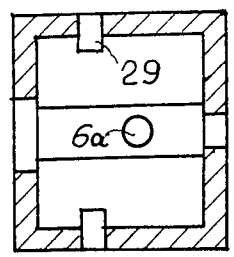
FIG. 12
FIG. 11

AUTOMATIC TRANSMISSION UTILIZING GYROSCOPIC SATELLITE GEARS

BACKGROUND OF THE INVENTION

The present invention relates to automatic transmissions.

Automatic transmissions are known which have gyroscopic gear drives with satellite gears in which gyroscopic moments are generated. U.S. Pat. No. 2,639,631 discloses for example a mechanism for power transmission with gyroscopic satellite gears which rotate about three mutually perpendicular axes. For obtaining a constant direction resulting moment which is not equal zero, it utilizes noncircular conical satellite gears, and the teeth of the central gear are formed on an undulating surface. However, this mechanism possesses some disadvantages. Since the carrier which carries the gyroscopic satellite gears has a forced rotation, the gyroscopic moments change the sign twice during its one revolution, so that the resulting moment decreases and therefore the converting property of the transmission worsens. A general disadvantage of the transmissions which use gyroscopic effects is that the gyroscopic moments which load the driving shaft are directly proportional to the square of its number of revolutions and become equal to the torque of the engine only in some modes of operation. In the event of deviations from them, the engine is either underloaded, or overloaded and can stall.

SUMMARY OF THE INVENTION

Accordingly, it is an object of the present invention to provide a transmission which avoids the disadvantages of the prior art.

In keeping with these objects and with others which will become apparent hereinafter, one feature of the present invention resides, briefly stated, in an automatic transmission of the above-mentioned general type, which has a reactor engaging with central gears of a gyroscopic gear drive.

Elements which transmit the moments from the central gears of the gyroscopic drive to satellite gears of another gear drive having central gears on driven and driving shafts, can be offset along the shafts (their axes) toward the side of the driven gear.

Elements of the carrier, which carry the gyroscopic satellite gears can be arranged with a possibility of mutually independent spinning relative to an axis which deviates from the axis of the transmission and from the spin axes of said gears.

The novel features of the invention are set forth in particular in the appended claims. The invention itself, however, will be best understood from the following description of preferred embodiments which are accompanied by the following drawings.

BRIEF DESCRIPTION OF THE DRAWINGS

FIGS. 5, 6, 7, 8 are schematic views of various embodiments of the automatic transmission, turned by 90° relative to FIG. 2 about an axis of the transiission wherein gyroscopic satellite gears are omitted; and FIGS. 9, 9a, 10, 11, and 12 are views showing fragments of the automatic transmission with various embodiments of mounting of the elements which transmit gyroscopic moments.

DESCRIPTION OF PREFERRED EMBODIMENTS

Figure 1:
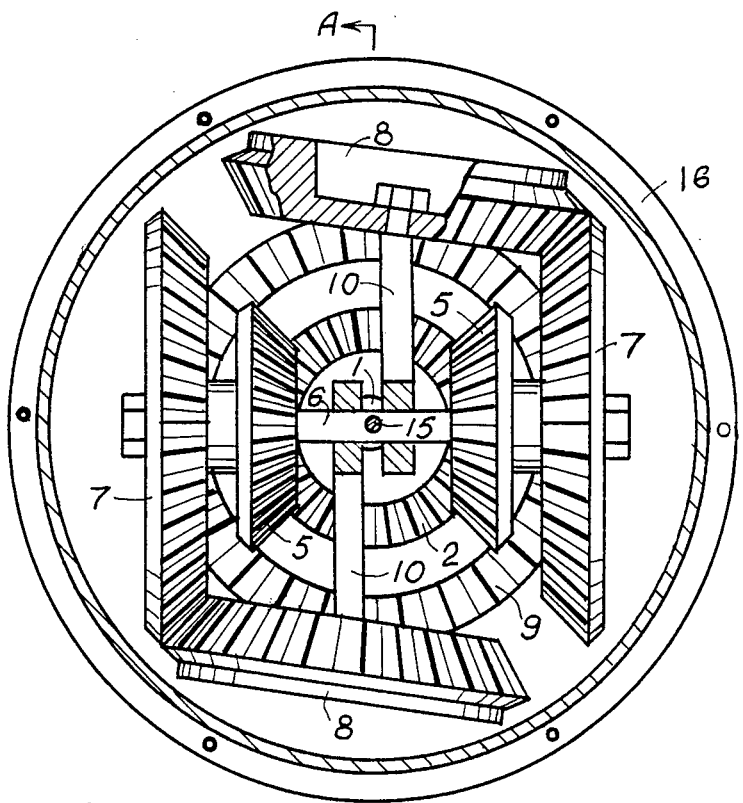
FIG. 1 is a view showing a cross section of an automatic transmission in accordance with the present invention.
Figure 2:
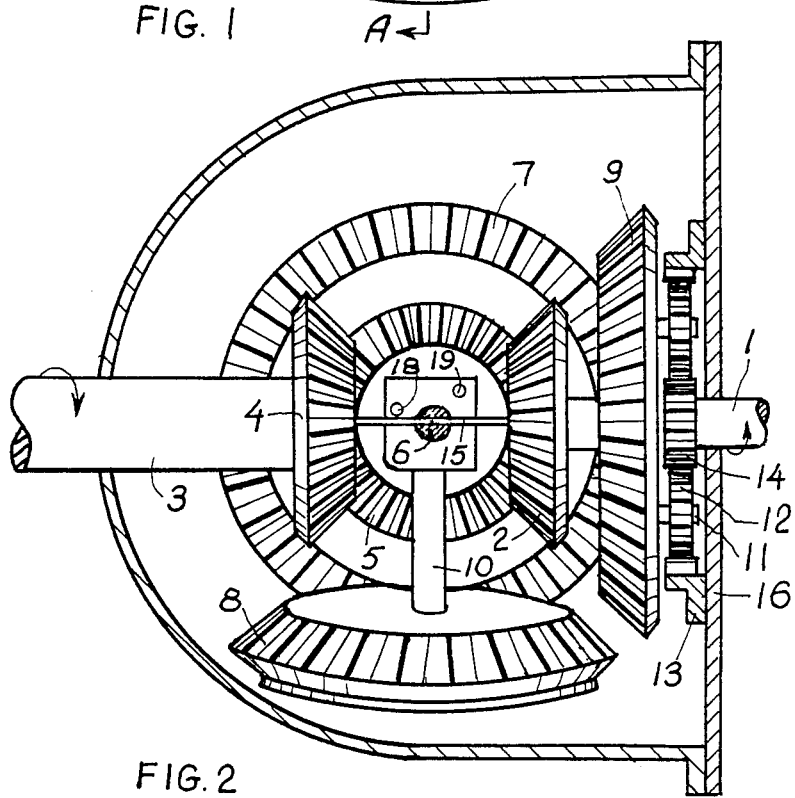
FIG. 2 is a view showing a section taken along the line A—A in FIG. 1, wherein an upper satellite gear is emitted.

As shown in FIGS. 1 and 2, an automatic transmission in accordance with the present invention has a driving shaft 1 with a fixedly mounted driving gear 2, a driven shaft 3 with a fixedly mounted driven gear 4, and satellite gears 5 engaging with the gears 2 and 4 and arranged on an axle 6 with a possibility of free rotation relative to the latter. Gears 7 of another gear drive are also arranged on the axle 6 with a possibility of free rotation relative to the same, and engage with gyroscopic satellite gears 8.

A reactor 9 is a gear which is arranged on the shaft 1 with a possibility of rotation relative to the latter and engages with the gears 7 which are central for the satellite gears 8. The satellite gears 8 are arranged on a carrier which has elements 10 mounted on the axle 6 with a possibility of swinging relative to the axle 6 independently of one another. Since the satellite gears can rotate about their axes and about an axis of the transmission, and also can swing about the third axis (axis of the axle 6) which deviates from the first-mentioned axes, they satisfy the conditions for generating gyroscopic moments in them.

The reactor 9 is provided with pins 11 which support cylindrical pinions 12. The pinions 12 can rotate about their axes and engage with an internal gear 13 and a pinion 14 fixedly mounted on the driving shaft 1. A rod 15 which is fixedly connected with the axle 6 and freely arranged in openings of the shafts 1 and 3, centers the system of gears on the axle 6 and prevents their displacement along the axes of the shafts. When the driven shaft 3 is braked, the rotation of the gear 2 with the driving shaft 1 forces the gears 5 to roll over the immovable gear 4. Therefore the axle 6 rotates in direction of the rotation of the gear 2 with a speed which is half speed of the latter. Simultaneously the pinion 14 rolls the pinions 12 over the internal gear 13, and by means of the pins 11 rotates the reactor 9 also in direction of rotation of the shaft 1. The dimensions of the gears 13 and 14 are selected so that the reactor 9 rotates slower than the axle 6 which therefore forces the gears 7 to roll over the reactor 9 and to rotate the satellite gears 8 about their axes of rotation (spin axes).

The gyroscopic moments which are generated in the satellite gears 8 and directed against the rotation of the gears 8 are transmitted to the gears 7 against the direction of rotation of the latter. As a result of this, the gears 7 produce two actions. On the one hand, they apply to the reactor 9 moments which are directed in the direction of its rotation. On the other hand, they brake the rotation of the axle 6 around the axis of the shafts. The braking moment which acts in the plane extending through the axis of the axle 6 perpendicular to the axes of the shafts is transmitted by means of the axle 6 to the gears 5, and through the latter is applied to the gear 4 or in other words to the driven shaft 3, as a torque directed against the rotation of the driving shaft 1 and loads the driving shaft through the gear 2. However, the moment applied to the reactor 9 is transmitted through the pins 11 and pinions 12 to the internal gears 13 mounted in a casing 16, and to the pinion 14 in direction of its rotation, and therefore unloads the shaft 1. Thus, it becomes possible to transmit to the driven shaft a resulting torque which is composed of a moment of engine and a reactive moment returned to the driving shaft.

Figure 3:
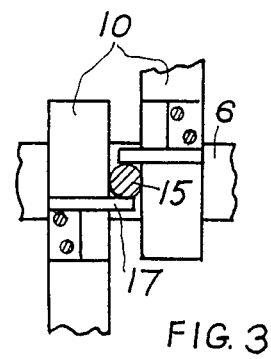
FIGS. 3 and 4 are views showing fragments of the automatic transmission, with mounting of its parts.
Figure 4:
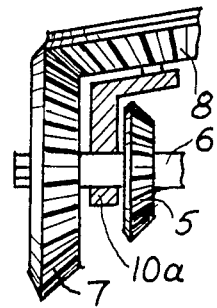

In accordance with the gyroscope theory, the moments which are generated in the gears 8 tend to incline their axes of rotation (spin axes) in direction toward the driven shaft, i.e. to turn the lower gear 8 (FIG. 2) with its element 10 in clockwise direction, and to turn the upper (omitted) gear in counterclockwise direction. However, centrifugal forces which are generated in the gears 8 and elements 10 because of their rotation about the axes of the shafts counteract this turning with a force increasing with the increase of the angle by which they have turned, since during this process the arm of centrifugal force application increases. As a result of this, they turn only by an insignificant angle, with which the moments of centrifugal forces become equal to the gyroscopic moments. However, the angle of inclination of the elements 10 can be reduced by mounting on them of springs 17 (FIG. 3). Since the construction is symmetrical relative to the axes of the shafts, and the moments in the satellite gears 8 are identical, the angle of inclination of the upper element 10 is equal to the angle of inclination of the lower element, and disbalance does not take place in the automatic transmission. Stops 18 and 19 prevents undesirable contact of the satellite gears 8 and the elements 10 with the reactor 9 and the gears 2 and 4 when the automatic transmission does not work. Elements 10a (FIG. 4) can be arranged between the gears 5 and 7, or in another place.

FIG. 5 shows a gear train diagram of the transmission corresponding to FIGS. 1 and 2. Instead of the conical gears 2,4 and 5, they can use spur gears (FIG. 6). A gear 20 is arranged on its driving shaft 1, an internal gear 21 is arranged on its driven shaft, and pins of pinions 22 are arranged on the axle 6.

FIG. 7 shows an embodiment of an automatic transmission in which the internal gear 13 is connected not with the casing, but with a conical gear 23. The latter transmits the moments generated in the gear 13, through the idle gears 24 arranged on the casing 16, to a gear 25 connected with the driven gear 3 so as to increase the moment at it.

FIGS. 8 and 9 show a transmission with an axle 6 which is offset from the plane of rotation of the axes of satellite gears 5a in direction toward the driven gear 4. A carrier 26 is freely arranged on the shafts 1 and 3 and is formed as two rings 27 fixedly connected with one another. The satellite gears 5a formed as toothed rims supported on the rings forming bearings. The axle 6 transmits braking moment to the rims 5a by its needle bearings 28 which roll over the internal surface of the rims 5a. Since the plane in which the braking moment is applied to the satellite gears 5a is offset because of the offset of the axle 6 which transmits this moment, the moment is distributed between the driving gear 2 and the driven gear 4 inversely proportional to their distance from this plane. It loads the driving shaft less, and to the contrary increases the torque at the driven shaft 3. Rollers 35 and 36 (FIG. 9a) can be arranged between the needle bearing 28 and the diametrically opposite side of the internal surface of the rim 5a.

A system of spur gears shown in FIG. 7 can be arranged between the reactor 9 and the gear 23.

FIG. 10 shows an embodiment of the transmission in which the elements which transmit the moments to the satellite gears 5b are formed as pins 29. A frame 30 is mounted on the shafts 1 and 3 which rotate in its openings. The frame 30 is provided with axles 6a which are fixedly mounted in the frame, for example by screwing-in and carry the gears 7. Rings 31 are arranged in the satellite gears 5b and formed for example as sliding bearings. The frame 30 is connected with the rings 31 by means of the pins 29 which can be mounted freely in openings of the frame and the rings. The ring has at its diametrically opposite side a curved surface (FIG. 11) contacting with the frame, to prevent the braking moment transfer to the ring directly from the frame. The braking moment applied by the gears 7 to the axles 6a is transmitted to the frame 30 and, via the pins 29, to the rings 31 and therefore to the satellite gears 5b mounted on the rod 26a.

The axles 6a can be offset to the right and to the left from the axis of the rod 26a. They can be formed of one piece with the rings 29 provided with the needle bearings, instead of the rings 31. Since the axes of the gears 7 in this case will not intersect with the axes of the gyroscopic satellite gears 5b mounted on the rod 26a by means of swinging elements 10, therefore the engagement therebetween can be of hypoidal type.

The frame can be cross-shaped as shown in FIG. 12 provided with openings for the axles 6a turned about the axes of the shafts by 90° or another angle relative to the openings for the pins 29.

The automatic transmission can be provided with additional gear drives, for example spur gear drive including a central gear 32 (FIG. 8) connected with the gear 4, an internal gear 33 connected with the gear 25, and pinions 34 connected with the driven shaft 3.

A reverse drive can be mounted before the driving gear 2 or after the driven gear 4. For increasing the moments in the gyroscopic satellite gears they can be provided with flywheels. Suitable fasteners, seals, bearings, collars and shoulders restrain all the members of the transmission against displacement. They are not shown since they are well known in the art.

The invention is not limited to the details shown since various modifications and structural changes are possible without departing in any way from the spirit of the present invention.

I claim:
1. An automatic transmission, comprising
    a driving shaft and a driven shaft defining an axis of the transmission and rotating about said axis;
    a first gear drive including central gears mounted on said shafts, and satellite gears engaging with said central gears;
    a second gyroscopic gear drive including central gears, a carrier, and gyroscopic satellite gears engaging with said central gears of said second gear drive and mounted on said carrier;
    elements connecting said gear drives with one another and transmitting gyroscopic moments from said second gear drive to said first gear drive; and
    a reactor engaging with said central gears of said second gyroscopic gear drive.
2. An automatic transmission as defined in claim 1, and further comprising a central pinion mounted on said driven shaft, a casing, an internal gear arranged in said casing, and pinions arranged on said reactor and engaging with said central pinion and said internal gear.

3. An automatic transmission as defined in claim 1, wherein the elements which transmit gyroscopic moments to said satellite gears of said first gear drive are formed as pins arranged in a frame and rings mounted freely on said satellite gears of said first gear drive.

4. An automatic transmission as defined in claim 1, wherein said carrier comprises said connecting elements which carry said gyroscopic satellite gears of said second gear drive, said connecting elements being mounted on an axle and arranged with a possibility of swinging independently of one another and relative to an axis of said axle which deviates from said axis of the transmission and from said axes of said gyroscopic satellite gears of said second transmission.

* * * * *